(12) United States Patent
Ryhorchuk et al.

(10) Patent No.: US 9,565,732 B2
(45) Date of Patent: Feb. 7, 2017

(54) LIGHTING NODES HAVING A CORE NODE AND SENSOR PODS

(71) Applicant: Sensity Systems Inc., Sunnyvale, CA (US)

(72) Inventors: Kent W. Ryhorchuk, Sunnyvale, CA (US); Carlos Henriquez, Sunnyvale, CA (US); Ezra Gold, Sunnyvale, CA (US); David Vucich, Sunnyvale, CA (US); Shin-Li Cecily Liu, Sunnyvale, CA (US)

(73) Assignee: Sensity Systems Inc., Sunnyvale, CA (US)

( * ) Notice: Subject to any disclaimer, the term of this patent is extended or adjusted under 35 U.S.C. 154(b) by 0 days.

(21) Appl. No.: 15/066,838

(22) Filed: Mar. 10, 2016

(65) Prior Publication Data

US 2016/0270179 A1    Sep. 15, 2016

Related U.S. Application Data

(60) Provisional application No. 62/130,732, filed on Mar. 10, 2015.

(51) Int. Cl.
*H05B 33/08* (2006.01)

(52) U.S. Cl.
CPC ................ *H05B 33/0854* (2013.01)

(58) Field of Classification Search
CPC ..... H05B 37/02; H05B 33/08; H05B 33/0842; H05B 33/0845; H05B 33/0854
USPC ............................ 315/209 R, 291, 307, 308
See application file for complete search history.

(56) References Cited

U.S. PATENT DOCUMENTS

2007/0250872 A1* 10/2007 Dua .................... H04N 7/163
725/81

* cited by examiner

*Primary Examiner* — Jimmy Vu
(74) *Attorney, Agent, or Firm* — Schwegman Lundberg & Woessner, P.A.

(57) ABSTRACT

A method and a system of lighting nodes having a core node and sensor pods is described. A core node, representing a master device, is positioned within a luminaire housing to enable lighting control for the luminaire. At least one peripheral device representing an integrated sensor pod, an external sensor pod, or a video node. Each of the peripheral devices representing a slave device and includes one or more sensors for detecting conditions. A pod bus, representing a master-slave bus, enables power signals to be transmitted to each of the peripheral devices. The pod bus also enables the core node to query each of the peripheral devices and each of the peripheral devices to respond to a query from the core node.

24 Claims, 9 Drawing Sheets

LIGHTING NODES HAVING A CORE NODE AND SENSOR PODS

RELATED APPLICATIONS

The present application claims the benefit of priority, under 35 U.S.C. Section 119(e), to U.S. Provisional Application No. 62/130,732, entitled "LIGHTING NODES HAVING A CORE NODE AND SENSOR PODS" filed Mar. 10, 2015, the entire contents of which are hereby incorporated by reference.

TECHNICAL FIELD

Embodiments of the present disclosure relate generally to sensor networks, and more particularly, but not by way of limitation, to lighting nodes having a cores node and sensor pods or other peripheral devices.

BACKGROUND

Today, sensor networks are being used in a wide range of application areas. For example, data collected by sensor networks may be used for environmental monitoring, security and surveillance, logistics and transportation, control and automation, and traffic monitoring. The sensor networks can be integrated with existing lighting infrastructures such as those used to light roads, streets and highways. By leveraging the existing lighting infrastructure, the existing luminaires and lighting fixtures can be transformed into sensor-equipped, smart devices capable of capturing and transmitting data to enable a broad array of applications and services.

BRIEF DESCRIPTION OF THE DRAWINGS

The various embodiments are illustrated by way of example, and not by way of limitation, in the figures of the accompanying drawings in which.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. As used herein, the term "or" may be construed in either an inclusive or exclusive sense. It will be evident, however, to those skilled in the art that embodiments of the inventive subject matter may be practiced without these specific details. In general, well-known instruction instances, protocols, structures, and techniques have not been shown in detail.

A networked environment may include a lighting sensor network that includes a sensor network in communication with a server system representing a sensor data storage and management platform (also referred to as a service data platform) via a network (e.g., a wide area network (WAN)). The sensor network may be coupled to a lighting infrastructure (or other infrastructure) that is capable of providing the sensor nodes within the sensor network with mechanical support for mounting the sensor nodes, and additional power and networking capabilities to the sensor nodes. In example embodiments, some or all of the sensor nodes may be attached, directly or indirectly, to lighting fixtures within the lighting infrastructure.

The NetSense lighting sensor network platform, developed by Sensity Systems Inc. of Sunnyvale California, provides an example of a lighting sensor network that may be used to implement various embodiments described. The NetSense framework enables deployment of a variety of sensors using a lighting infrastructure that allows applications to securely access sensor data information, which may represent sensitive identification information. The key components of NetSense includes end-point sensor data collection devices (e.g., sensor nodes), a server platform that processes and enables applications to securely access the sensor data (e.g., service data platform) and a user interface that displays the sensor data.

Figure 1:
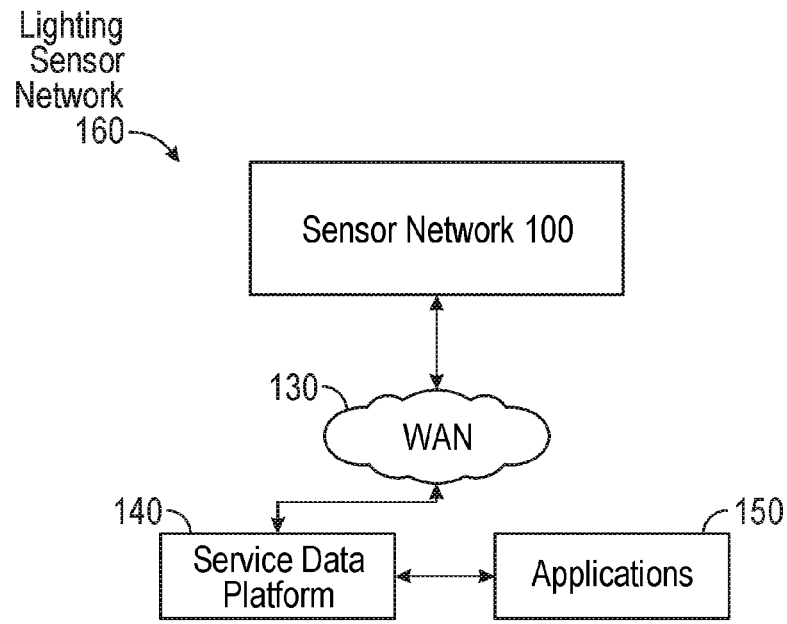
FIG. 1 is a diagram of a lighting sensor network suitable for use in various embodiments.

FIG. 1 illustrates an implementation of a lighting sensor network 160 suitable for use in various embodiments. The lighting sensor network 160 enables deployment of a variety of sensors using a lighting infrastructure and allows the sensor data to be securely transported to the service data platform 140 for secure storage and processing at the request of customers.

FIG. 1 shows the various components of the lighting sensor network 160 according to an example embodiment. The lighting sensor network 160 represents a lighting infrastructure integrated with a sensor network 100 that is networked with a service data platform 140. The sensor nodes (not shown) include one or more sensors. The lighting infrastructure includes the sensor nodes, attached directly or indirectly to lighting fixtures within the lighting infrastructure. The sensor nodes in combination with the lighting infrastructure form the sensor network 100.

The sensor network 100 includes multiple spatially distributed sensor nodes used to monitor physical and environmental conditions, such as temperature, sound, pressure, light, traffic (vehicles and people), and vibrations.

The sensor network 100 usually monitors an area such as a customer site. For example, the sensor nodes may be attached to lighting fixtures 105 located at a customer site representing a lighting infrastructure. The lighting infrastructure may be capable of providing power to the sensor nodes and mechanical or physical support for the sensor nodes. The infrastructure may also provide additional networking communication interfaces for the sensor network 100. The sensor nodes are deployed within the site to monitor various conditions, events, or phenomenon that provides insights to users of the lighting sensor network 160. In alternative embodiments, only some of the lighting fixtures within a lighting infrastructure are attached, directly or indirectly, to the sensor nodes.

The sensor nodes communicate over a network, such as a wide area network (WAN) 130 with the service data platform 140, which may represent one or more application servers residing in a cloud computing environment. In many applications, the sensor network 100 communicates with a local area network (LAN) or wide area network (WAN) through a gateway. For example, the gateway acts as a bridge between the WAN 130 and the other network (e.g., LAN, which is not shown). The sensor data collected at the sensor nodes in the sensor network may be securely transported to a remote server system (represented by the service data platform 140) for storage and processing. This enables data to be stored and processed by devices with more resources, for example, in a remotely located server system residing in a cloud computing environment.

In various embodiments, the service data platform 140 may be owned and operated by an entity referred to as a service provider. The owner of the lighting infrastructure may be referred to as a customer of the service provider. In some examples, the customer of the service provider may allow third parties to access the sensor data collected at the sensor nodes. In various embodiments, the sensor data is processed by the sensor network 100 and/or the service data platform 140.

The service data platform 140 also provides both programmatic access thru API servers and web access thru web servers to data stored in the service data platform 140. Data may be stored in the service data platform 140 in one or more databases, accessed through a database server. For example, the service data platform 140 may provide application programming interfaces (APIs) for third party applications 150 to access sensor data stored in the service data platform 140. In another example, the service data platform 140 may also provide access to the sensor data via web servers.

The service data platform 140 may represent a platform for managing sensor data that includes database services for customers. Developers of third party applications 150 may access the sensor data stored in the database and build their own applications 150 utilizing the sensor data. Other online data services may also be provided by the service data platform 140, for example, analyzing and processing the sensor data which are accessible to authorized users of the service data platform 140. The service data platform 140 may include APIs and interfaces for third party application developers, a middleware containing the business logic needed for managing and processing the sensor data, a storage model suitable for the efficient storage and retrieval of large volumes of the sensor data, and appropriate security measures that are available to customers for protecting unauthorized access to their sensor data.

FIG. 2 and FIGS. 3A-3C illustrate examples of sensor nodes which include multiple sensor devices and a luminaire 200 according to various embodiments. As described above, some or all of the sensor nodes may be attached, directly or indirectly, to lighting fixtures within the lighting infrastructure. In various embodiments, the lighting fixture includes a luminaire 200. The luminaire 200 may represent the light emitting diodes (LEDs) and all components directly associated with the distribution, positioning, and protection of the light unit. In some embodiments, the luminaire 200 does not include the support components, such as an arm or pole; the fasteners used to secure the luminaire; control or security devices; or power supply conductors.

Figure 2:
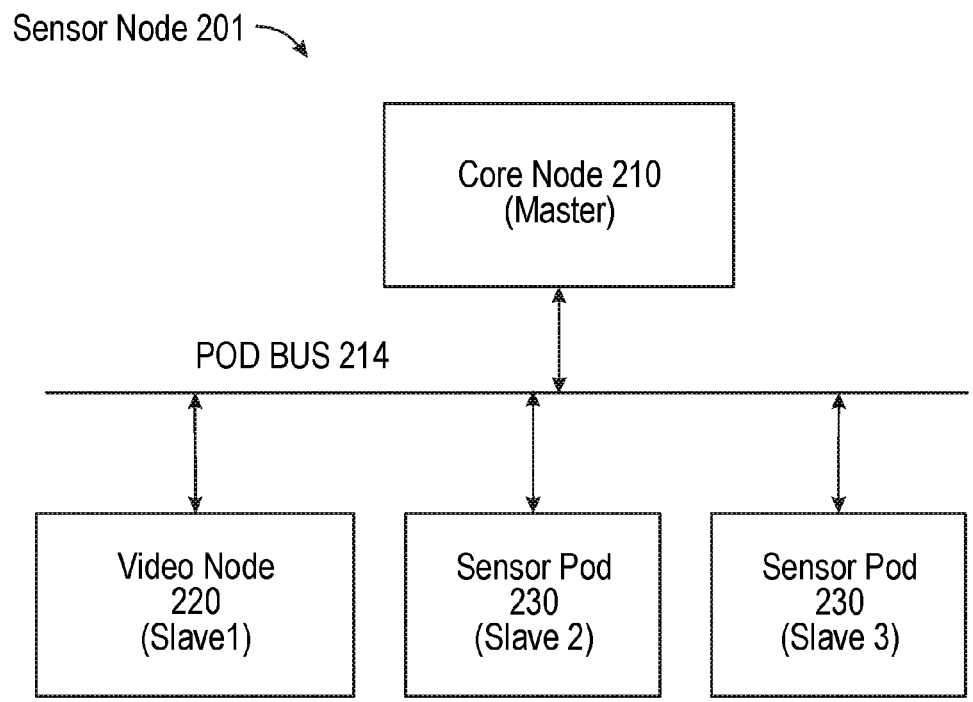
FIG. 2 is a block diagram of sensor node, according to an example embodiment.
Figure 3A:
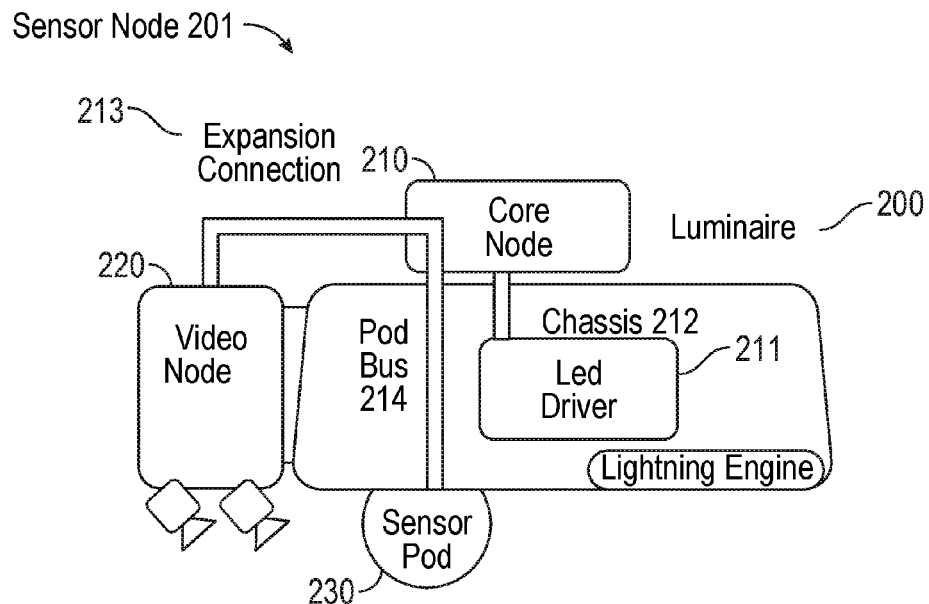
FIGS. 3A-3C illustrates block diagrams of sensor nodes having a pod bus, according to various embodiments.
Figure 3B:
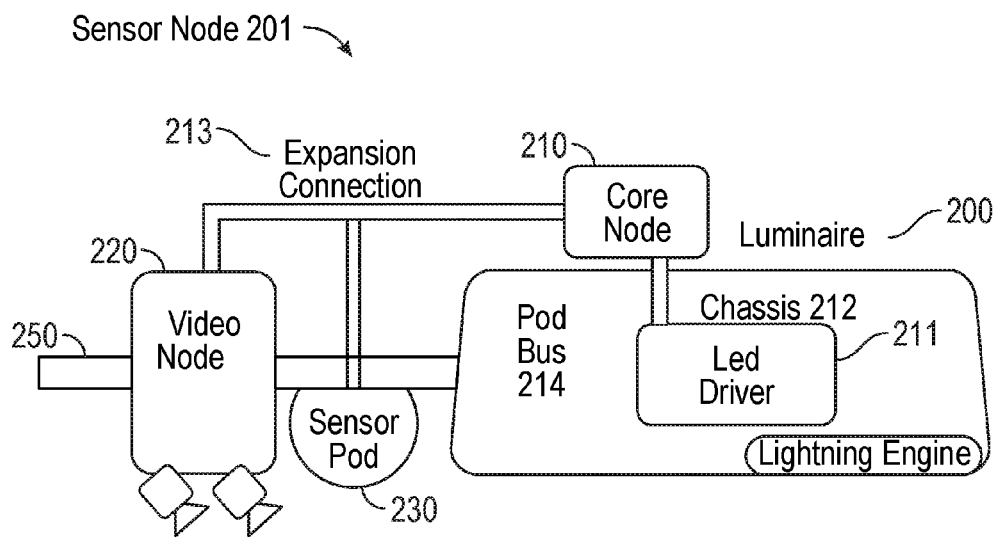
Figure 3C:
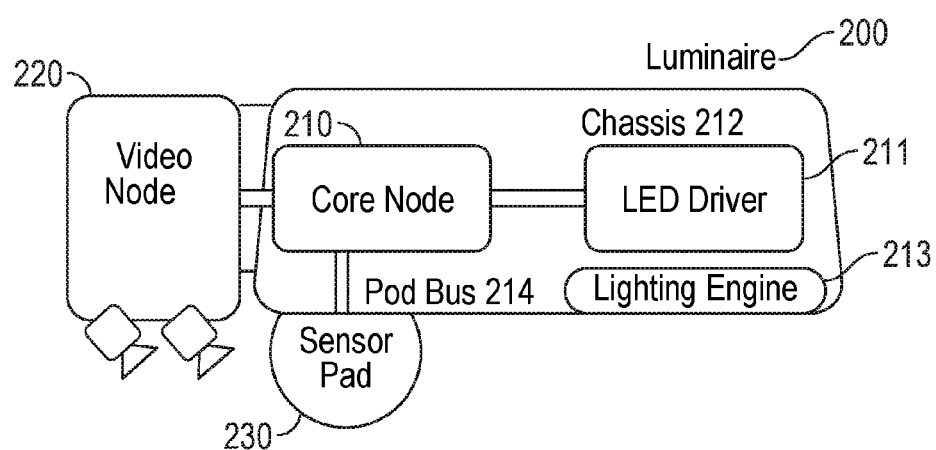

FIG. 2 illustrates a block diagram of a sensor node 201 which includes a core node 210 and multiple peripheral devices. The sensor node 201 may also be referred to as a lighting node in some embodiments and may include a luminaire 200 (as shown in FIGS. 3A-3C). The peripheral devices may represent other sensor nodes, sensor pods, or other types of devices. In various embodiments, the core node 210 may be coupled to multiple peripheral devices via a pod bus 214. The peripheral devices shown in FIG. 2 are represented by a video node 220 and sensor pods 230. In example embodiments, the core node 210 represents a master device and the peripheral devices represent slave devices. The architecture of the sensor node 201 allows additional peripheral devices to be communicatively coupled on the same bus (e.g., the pod bus 214), and in some embodiments, the sensor node 201 may provide power over the bus (e.g., the pod bus 214) for optionally powering the peripheral devices.

In various embodiments, the core node 210 provides full lighting control capabilities and also collects basic sensor information (e.g., ambient light, motion detection, temperature, and power monitoring). In example embodiments, the core node 210 may be designed to be low-cost, light weight, and adaptable to be deployed alongside any third-party lighting fixture via a NEMA socket or fully integrated into luminaires.

In various embodiments, the video node 220 may include one or more camera or video devices. The video node 220 may be considered to be a high-performance node in the network. In some embodiments, the video node 220 may be designed to support higher-bandwidth data (e.g., video data) and contain a computational engine for analyzing data-rich applications (e.g., security and smart parking) across the light sensor network 160. In some embodiments, the video node may include the ability to support the local high-intensity analysis of high definition (HD) video, which can be connected via one or more cameras. In various embodiments, the video node 220 includes a wireless radio that enables the video node 220 to communicate, directly or indirectly, with a service data platform.

In FIG. 3A, the core node 210 is positioned on top of the luminaire 200 via an attachment device (not shown). In an example embodiment, the attachment device is a NEMA socket that conforms to the published specification ANSI C 136.41 that was approved on Dec. 5, 2013 and published on Jan. 29, 2014. The NEMA socket enables the core node 210 to be detachable from the luminaire 200. The luminaire 200 includes chassis 212, which includes a LED driver 211. The LED driver 211 is generally used to control the current and/or voltage to a lighting engine 212. Extending from the core node 210 to the sensor pod 230, through the chassis 212, is the pod bus 214. The video node 220 which also includes the video sensor is communicatively coupled to the core node 201 via the expansion connection 213.

In FIG. 3B, the core node 210 is positioned on top of the luminaire 200 via an attachment device (not shown), such as a NEMA that provides functionality to connect a device used to control the light level of a luminaire as described above (e.g., ANSI C136.41), according to an example embodiment. The luminaire 200 includes chassis 212, which includes a LED driver 211. The LED driver 211 is generally used to control the current and/or voltage to a lighting engine 212. The luminaire 200 also includes the lighting engine 212. The pod bus 214 extends from the expansion connection 213 to the sensor pod 230. The pod bus 214 also extends from the base of the core node 210 (not shown) to the expansion connection 213. The video node 220 which also includes the video sensor is communicatively coupled to the core node 201 via the expansion connection 213.

In FIG. 3C the core node 210 is located within in the luminaire 200 according to an example embodiment. The sensor pod 230 is communicatively coupled to the core node 210 via the pod bus 214. The video node 220, including the video sensor, is also communicatively coupled to the core node 210. The luminaire 200 includes a chassis 212 and a lighting engine 212. The core node 210 and the led driver 211 are positioned within the chassis 212. In the example shown in FIG. 3C, a NEMA socket is not used because the core node 210 has been integrated into the luminaire 200 by the manufacturer of the luminaire 200.

In the example embodiments shown in FIGS. 3A-3C, the pod bus 314, is also referred to as an internal bus or a master-slave bus. The core node 210 represents a master device and the sensor pods 230 and the video node 220 (also referred to as peripheral devices) represent slave devices. Communications between the core node 210 and the sensor pods 230 is through the pod bus 214. In various embodiments, the pod bus 214 extends through the expansion connection 213. Additionally, the core node 210 provides power signals to the sensor pods 230 over the pod bus 214. In various embodiments, the pod bus 214 is considered to provide dual functionality.

FIGS. 3A and 3C illustrate examples of sensor pods 230 which are integrated with the luminaire 200. FIG. 3B illustrates an example of a sensor pod 230 considered to be an external sensor pod. As shown in FIG. 3B, the external sensor pod 230 is supported by an arm 250 of a lighting fixture. In the embodiment shown in FIG. 3B, the video node 220 and the luminaire 200 are also supported by the arm 250. FIGS. 3A- 3C illustrate examples of the video node 220 communicatively coupled to the core node 210. FIGS. 3A-3C also illustrate an expansion connection 213 which represents an external portion of the pod bus 214. The expansion connection 213 enables additional peripheral devices (e.g., external sensor pods and video nodes) to be connected or added to the sensor node 201 in the field after deployment to provide additional functionality to the sensor node 201.

Figure 4:
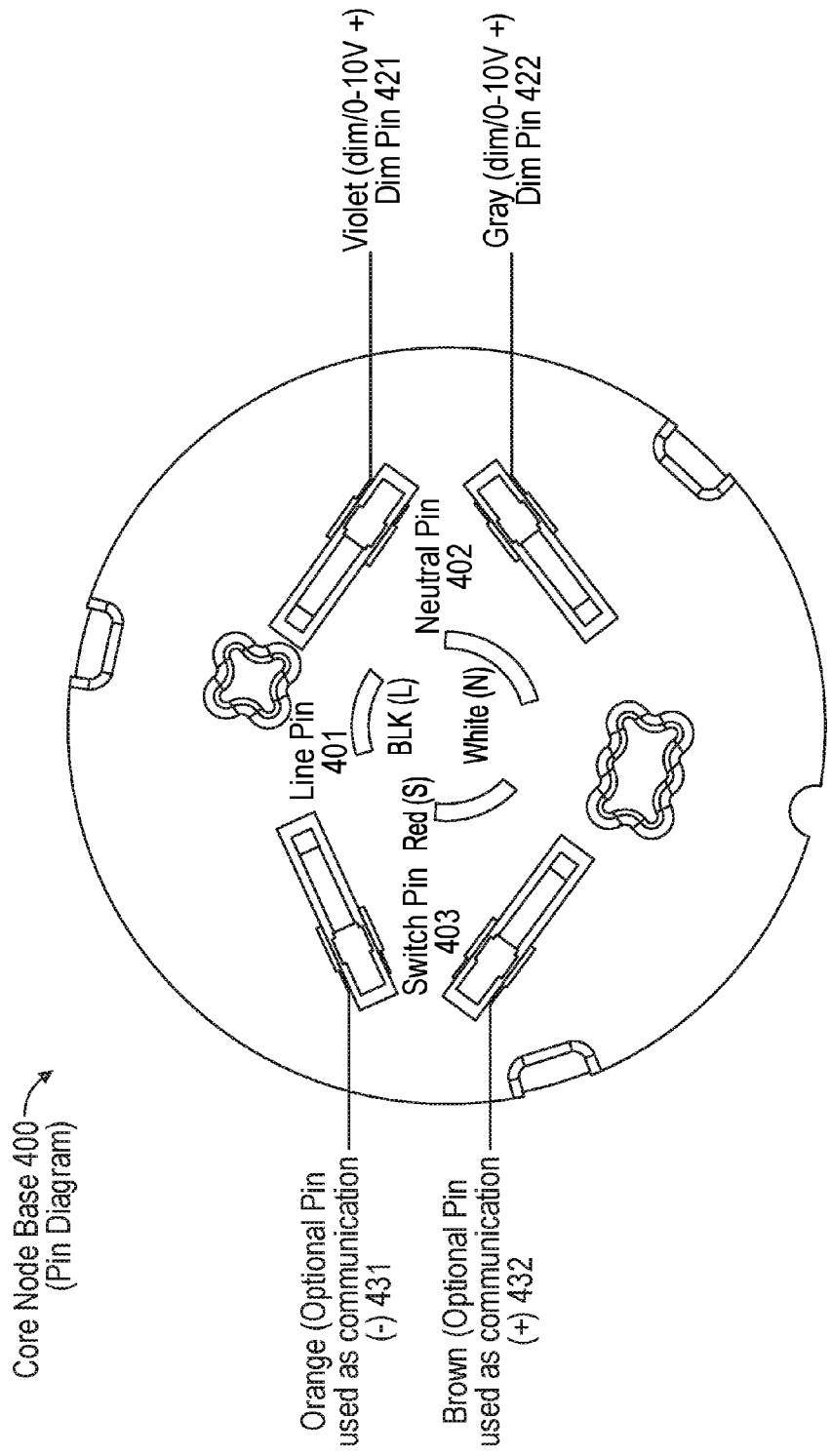
FIG. 4 illustrates a pin diagram of a core node base that conforms to the published ANSI specification for C136.41.

In an example embodiment, the sensor node 201 includes a core node 210 to enable lighting control for a luminaire 200. The core node 210 has a base forming a plug portion of a socket. An example of a base is shown in FIG. 4. The plug portion of the socket has two pins designated as optional pins. For example, the optional pins may be the brown pin 432 and the orange pin 431 described in the ANSI published specification C136.41 and shown in FIG. 4. The sensor node 201 includes at least one peripheral device. Each peripheral device includes one or more sensors for detecting conditions and producing sensor information based on the detected conditions. The sensor node 201 includes a pod bus 214 enabling power signals to be transmitted to each of the peripheral devices and communications signals to be transmitted between the core node 210 and each of the peripheral devices via a two wire communication path coupled to the two pins designated as optional pins.

Figure 5:
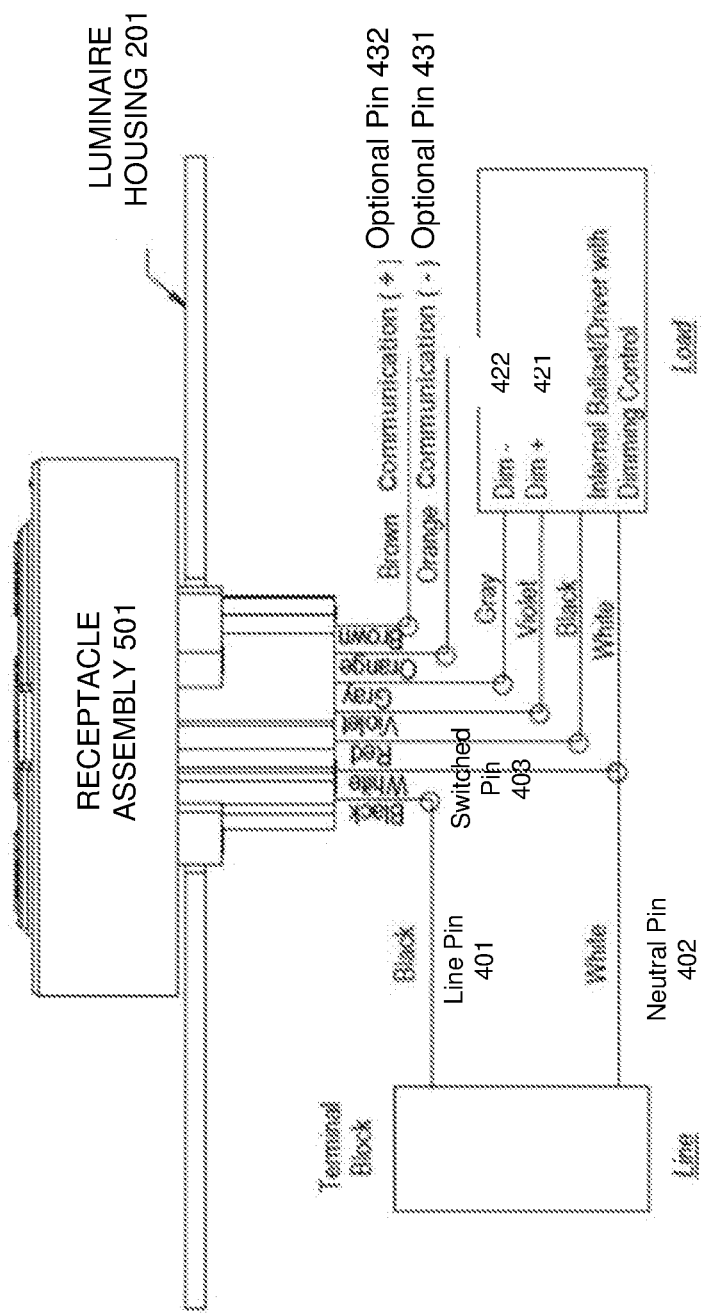
FIG. 5 illustrates an example of a receptacle for a NEMA socket according to an example embodiment.

In a further embodiment, the socket represents a NEMA socket that includes a receptacle (as shown in FIG. 5 by the receptacle assembly 501) attached to the base of the core node 210 such that the core node 210 is enclosed by the NEMA socket. The NEMA socket conforms to an ANSI published specification (e.g., C136.41) and provides light level control for a light-emitting diode (LED) driver for the luminaire 200. In alternative embodiments, other detachable sockets may be used to connect the core node 210 to the luminaire 200.

In various embodiments, the pod bus 214 extends from the base of the core node 210 to each of the peripheral devices. In some embodiments, each of the peripheral devices represents one of an integrated sensor pod communicatively coupled to a portion of the pod bus 214 within the luminaire 200, an external sensor pod communicatively coupled to a portion of the pod bus 214 external to the luminaire 200, or a video node 220 communicatively coupled to the portion of the pod bus 214 external to the luminaire 200. In a further embodiment, the integrated sensor pod is integrated with the luminaire 200 by a manufacturer of the luminaire 200.

In example embodiments, the portion of the pod bus 214 external to the luminaire 200 represents a cable attached to a connector on the core node 210. In such an embodiment, the external sensor pod is communicatively coupled to the cable. In another example embodiment, the portion of the pod bus 214 external to the luminaire 200 enables video node 220s and external sensor pods to be added to the sensor node 201 after the sensor node 201 is deployed in the field.

In some embodiments, the portion of the pod bus 214 external to the luminaire 200 represents a cable attached to a connector on the core node 210. In such an embodiment, the video node 220 includes at least one video camera communicatively coupled to the cable. In a further embodiment, the video node 220 performs video analytics data processing prior to transmitting video data to the core node 210 via the cable. In an example embodiment, the cable includes a splitter to enable more than one peripheral device to be attached to the cable.

In various embodiments, the sensor node 201 represents a lighting node in the lighting sensor network 160. In example embodiments, the communication signals represents at least one of command, request, and interrupt signals from the core node 210 transmitted to least one peripheral device. In further embodiments, the communication signals include data signals that transmit the sensor information from each of the peripheral devices to the core node 210.

In one embodiment, the core node 210 collects the sensor information detected by at least one of the integrated sensor pod or the external sensor pod and transmits the sensor information to the service data platform 140 to enable one or more applications 150 to access the sensor information; and wherein the accessed sensor information includes raw sensor information or processed sensor information at the core node 210 and the service data platform 140. In another embodiment, the core node 210 collects the video information captured by at least one video camera and transmit the video information to a service data platform 140 to enable one or more applications 150 to access the video information; and wherein the accessed video information includes raw video information or processed video information the core node 210 and the service data platform 140.

In various embodiments, the core node 210 represents a master device and each peripheral device represents a slave device, and wherein the pod bus 214 represents a master-slave bus. In further embodiments, the pod bus 214 enabling the core node 210 to query the each of the peripheral devices and each of the peripheral devices to respond to a query from the core node 210.

In other example embodiments, a lighting node includes a luminaire 200 housing that includes a light-emitting diode (LED) driver and a light engine. The lighting node also includes the core node 210 positioned within the luminaire 200 housing, the core node 210 enabling lighting control for the luminaire 200. The lighting node also includes at least one peripheral device. The at least one peripheral device includes an integrated sensor pod having one or more sensors for detecting conditions and producing sensor information based on the detected conditions. The lighting node also includes a pod bus 214 positioned within the luminaire 200 housing and represents a master-slave bus. The pod bus 214 enables power signals to be transmitted to each of the peripheral devices. The core node 210 representing a master device and each of the peripheral devices representing a slave device such that the pod bus 214 enables the core node 210 to query each of the peripheral devices and each of the peripheral devices to respond to a query from the core node 210.

In further embodiments, a sensor network includes a plurality of sensor node 201s communicatively coupled via a network. At least some of the sensor nodes 201 include the core node 210 to enable lighting control for a luminaire 200. The core node 210 having a base conforming to a plug portion of a NEMA socket where the plug portion of the NEMA socket having two pins designated as optional pins. At least some of the sensor node 201s includes at least one peripheral device. Each peripheral device includes one or more sensors for detecting conditions and producing sensor information based on the detected conditions. At least some of the sensor node 201s includes a pod bus 214 enabling power signals to be transmitted to each of the peripheral devices and communications signals to be transmitted between the core node 210 and each of the peripheral devices via a two wire communication path coupled to the two pins designated as optional pins.

FIG. 4 illustrates a diagram of a pin diagram that is referred to as the NEMA socket. More specifically, the NEMA socket conforms to published specification ANSI C136.41 that was approved on Dec. 5, 2013 and published on Jan. 29, 2014. This standard describes a method of light level control between an external locking type photocontrol (or similar device) and a dimmable ballast or driver for street and area lighting equipment. The locking type photocontrol includes a plug (also referred to as a base) and receptacle. The plug (or base) used in a locking-type dimmable control device may be installed in a dimmable receptacle.

In various embodiments, the core node 210 may provide functionality to directly control the dimmable ballast or driver, in addition to operating as a sensor node with networking capabilities. The pin diagram for the core base node 400 illustrates a line pin 401 (having a black wire), a neutral pin 402 (having a white wire), and a switched pin 403 (having a red wire). The pins 401-403 represent the high voltage pins as defined by the published specification ANSI C126.41. The dim pin 421 (shown by the violet wire) and the pin 422 (shown by the gray wire) are used to provide positive and negative voltages, respectively, for providing dimming functionality for the luminaire 200. The published ANSI C136.41 specification also includes tv/ooptinnn pins 431 and 432 (shown by orange and the brown wires). The optional pins 431 and 432 are used in various embodiments for communication signals and power lines (or conductors). The optional pin 431 may represent ground and the optional pin 432 may represent 5 volts (V)+ in their role as power conductors, according to example embodiments. The optional pins 431 and 432 also have a dual role by superimposing communication signals onto the power lines. The communication signals communicatively couple the core node 210 with the peripheral nodes via the pod bus 214, as shown in FIG. 2.

The published ANSI C136.41 specification also defines a receptacle for mating with the photocontrol base. An example of a photocontrol base is described above in conjunction with FIG. 4. In an example embodiment, the core node base 400 represents a photocontrol base. In various embodiments, the photocontrol base, together with a mating receptacle, is used to connect a core node to a luminaire.

FIG. 5 illustrates a diagram of a receptacle assembly 501 that conforms to the published ANSI 136.41 specification. The receptacle assembly 501 is connected to the core node base 400 (not shown), which is the base of the core node in example embodiments. As shown in FIG. 5, the receptacle assembly 501 is positioned on the luminaire housing 201 with the various colored wires extending inside the luminaire housing 201.

The line pin 401 from the core node base corresponds to the black wire, the neutral pin 402 from the core node base corresponds to the white wire, the switched pin 403 from the core node base corresponds to the red wire, the dim pin 422 from the base corresponds to the gray wire, the dim pin 421 from the base corresponds to the violet wire, the open pin 432 from the core node base corresponds to the brown wire, and the open pin 431 from the core node base corresponds to the orange wire. In other words, the pins are connected to the corresponding wires as described above.

Figure 6:
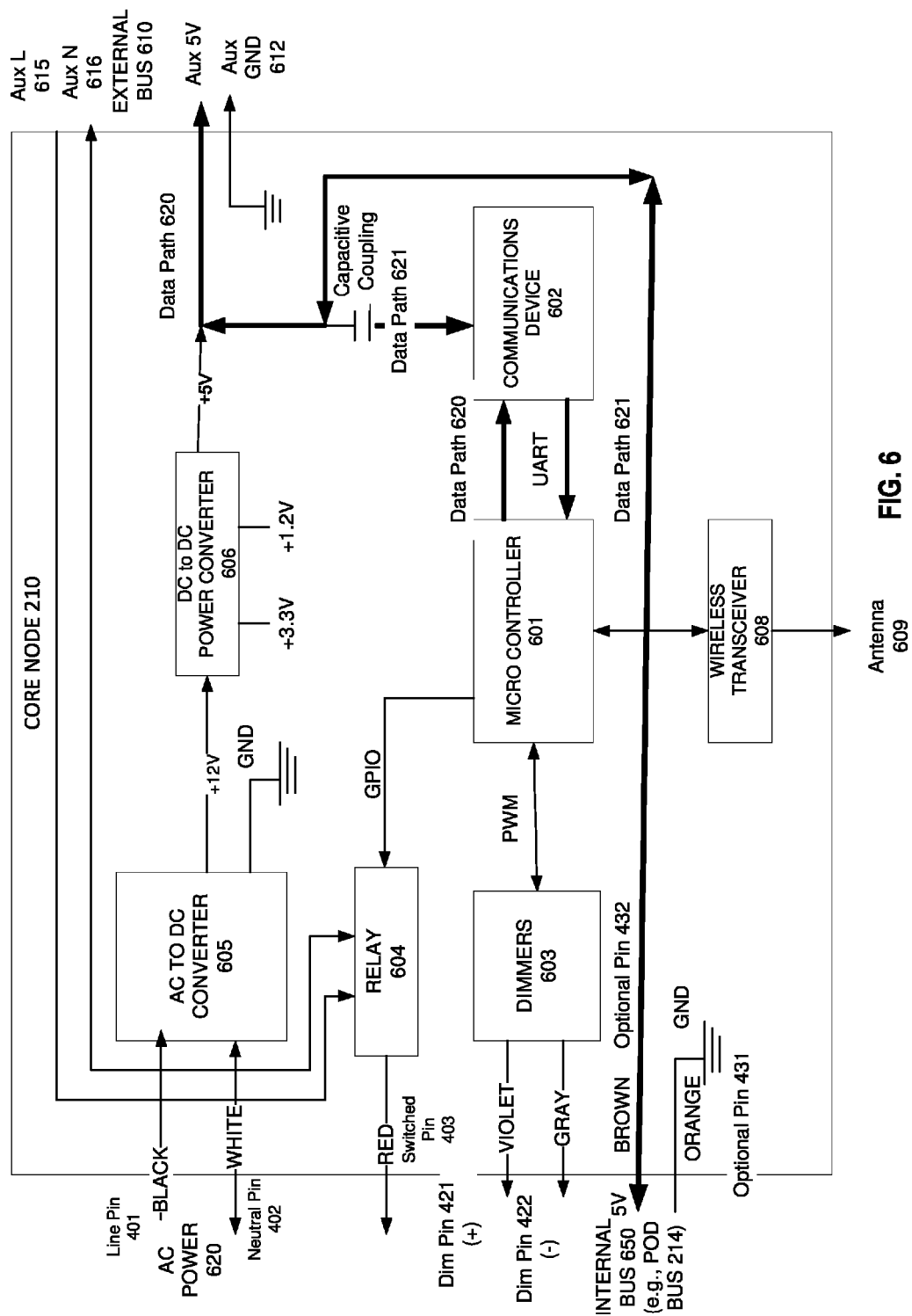
FIG. 6 illustrates a block diagram of a core node, according to an example embodiment

FIG. 6 illustrates a block diagram of the core node 210, according to an example embodiment. The core node 210 includes an external bus 610 with an auxiliary 5V+ line and an auxiliary ground terminal 612. In an example embodiment, the external bus 610 is communicatively coupled to the expansion connection 213. AC power 620 is provided by a light fixture or infrastructure (e.g., light pole) via the black wire referred to as the line in (which is associated with the line pin 401). The power signal from the line pin 401 provides input to an alternating current (AC) to direct current (DC) converter 605. The output (12V+) of the AC to DC converter 605 is then converted by the DC to DC power converter 606 to 5V+. The output of the DC to DC converter 606 then provides a 5V+ output to the external bus 610. In various embodiments, data and communication signals are transmitted over the data path 621. The data path 621 provides communicative coupling to the external bus 610 and the internal bus 650. In an example embodiment, the external bus 610 extends the pod bus 214 to enable connections with external sensor pods 230 and video nodes 220, and the internal bus 650 enables connections with internal sensor pods 230. In various embodiments, data from the core node 210 is sent to the service data platform (not shown) via the external bus 610. The external bus 610 and the internal bus 650 provide dual functionality by providing both power signals to the sensor pods and the video nodes, and communication signals between the sensor pods and the core node and the video nodes and the core node.

The relay 604 provides power to the luminaire 200 using the red wire (also referred to as line out) via the switched pin 403. The white wire provides neutral signals and is a bidirectional signal. The auxiliary power signals referred to as Aux L 615 and Aux N 616 providing line and neutral power signals respectively, are communicatively coupled to the relay 604.

The communications controller 601 is communicatively coupled to the dimmers 603. The micro controller 601 provides a pulse width modulation (PWM) signal that controls a 0-10V dimmer circuit, which is carried on the violet and gray wires and is only used for dimming.

The micro controller 601 is also communicatively coupled to the communications device 602 via a universal asynchronous receiver/transmitter (UART). The communications device 602 is capacitively coupled to the 5V+ power on the brown wire and allows communications with devices connected to and possibly powered by the brown (5V) and orange (GND) wires.

The micro controller 601 provides a general purpose input output (GPIO) signal to the relay 604 that switches power (on/off) on the red wire. The GPIO signal controls the relay 604.

The micro controller 601 is communicatively coupled to the wireless transceiver 608, also referred to wireless radio in some embodiments, for wireless communications over Wi-Fi or other wireless protocols using an antenna 609. For example, the wireless transceiver may communicate using the Bluetooth communications protocol including the Bluetooth low energy (BLE) communications protocol. The communications device 602 provides functionality for the core node 210 to communicate (and send data) via the external bus 610 to the service data platform and other devices.

The brown and orange wires (connected to the brown pin 432 and the orange pin 431, respectively) provide communications signals to the internal bus referred to as the pod bus. In various embodiments, internal bus represents a master-slave bus, where the core node 210 represents the master device and the sensor nodes or other peripheral devices represent the slave nodes. The communication signals may represent broadcast signals requesting one or more sensor pods or other peripheral devices to sign on. The communication signals may represent commands or requests to the one or more sensor pods or other peripheral devices. The communication signals may represent interrupts from the sensor pods 230. Communication signals and data may be transmitted over data paths 620 within the sensor node 201.

Figure 7:
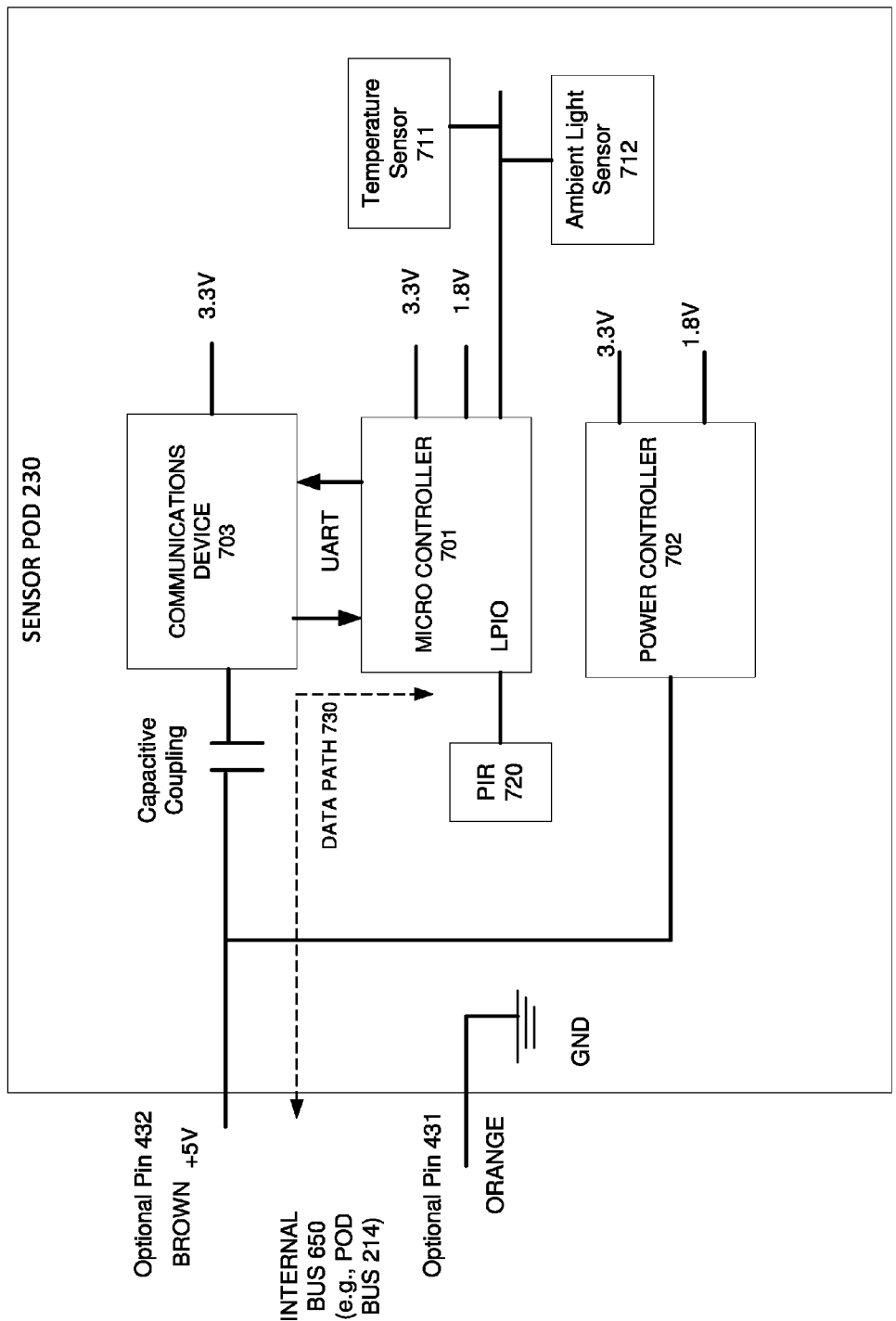
FIG. 7 illustrates a block diagram of a sensor pod, according to an example embodiment.

FIG. 7 illustrates a block diagram of a sensor pod 230, according to example embodiments. The sensor pod 230 represents a slave device which is controlled by the core node 210 in a sensor node 201. As shown in FIG. 2, a sensor node 201 may include a core node 201 and multiple peripheral devices (e.g., video node 220 and sensor pods 230). The core node 210 communicates with the peripheral devices over the internal bus 650. The pod bus 214 is an example of the internal bus 650. As shown in FIG. 7, the internal bus 650 includes the brown wire (associated with the optional pin 432) and the orange wire (associated with the optional pin 431). The internal bus 650 may be used for transmitting both power signals and communication signals. The orange wire is grounded and the brown wire provides a 5V power signal in example embodiments. In the example embodiments, shown in FIGS. 3A-3C, the pod bus 214 provides a communication path between the core node 210 and the sensor pod 230. The dotted arrow referred to as a data path 730 represents the flow of data within the sensor pod 230.

Unlike the core node 210, the sensor pod 230 cannot communicate directly outside the sensor node 201. Since the sensor pod 230 is a slave device communicatively coupled to the core node 210, which is the master device, the sensor pod 230 can respond to requests from the core node 210 and can initiate messages to the core node 210 by using a provisioned time slot dedicated for its use or shared with other pods. In the case of a time slot shared with other nodes, sensor pods may incorporate a mechanism to resend messages that are not acknowledged as being received by the master device. In an example embodiment, the sensor pod 230 only provides responses to the core node 210, via the internal bus 650 only in response to requests received from the core node 210. In other embodiments, sensor pods 230 can initiate messages using a provisioned time slot. In various embodiments, the sensor pod 230 is queried by the core node 210 before it provides a response.

In FIG. 7, the sensor pod 230 includes a temperature sensor 711 and an ambient light sensor 712. In other embodiments, the number of sensors within the sensor pod 230 may vary. The micro controller 701 is communicatively coupled to the communications device 703. Capacitive coupling is provided between the input from the brown wire (associated with the optional pin 432) and the communications device 703. The power controller 702 receives power signals from the internal bus 650, in particular, input from the brown wire (associated with the optional pin 432). In some embodiments, the micro controller 701 has a low power input output (LPIO) that is coupled to a PIR 720.

The internal bus 650, which includes the optional pins 431 and 432, enables the following features to be implemented in the sensor node 201:

- Providing power and data over two wire communication paths, between the core node 210 and the peripheral devices, by using the optional pins available in the NEMA socket as defined by the ANSI published specification C136.41.
- Ability to connect additional sensors (e.g., sensor pods) on the same internal bus 650, or an external connection (e.g., the video node 220 shown in FIGS. 3A-3C). The sensor node 201 may provide functionality to plug in additional sensors without having to modify the core node 210.
- Provide low cost wiring inside the luminaire 200 because the NEMA socket as defined by the ANSI published specification C136.41 does not require the optional pins to be terminated when not used. Thus, a manufacturer of the luminaire 200 can avoid using higher cost coaxial or twisted pair wire connectors.
- No requirement to provide bus termination for the optional pins, as compared to LAN or RS-485.
- The flexibility to use either internal or external sensor integration with the luminaire 200 since it is transparent to the core node 210.
- A master/slave bus with auto-discovery of peripheral devices by the core node 210.
- Optionally providing power over the internal bus 650 for powering sensors.
- The ability to pass through sensor data from the sensor pods 230 to the service data platform, which may be residing in the cloud.
- Allow control of devices attached to the internal bus 650 (e.g., the video node 220).

Referring back to FIG. 2, the sensor node 201 includes a master device and three slave devices (e.g., slave 1, slave 2, and slave 3). The sign-on or discovery process which is used to enable communication between the master and the slave devices is described below.

During a first operation, a master device broadcasts a command for slaves to respond at a random time within a time interval.

During a second operation, each slave device picks a time slot and transmits a single byte number on the bus. In various embodiments, time slots 0-15 represent 1 millisecond per time slot. Each slave devices uses a random number from 0-15 to pick a time slot to respond on to a sign on command.

During a third operation, the master device broadcasts a command for each slave number it receives to have the slave who provided the number, provide the master device with its unique identification (ID) number (which may be a serial number).

During a fourth operation, each slave sends its unique ID number to the master device.

During a fifth operation, the master assigns an 8-bit node address to each slave.

Once sign on or discovery of the slave devices is complete, then the sensor node 201 operates in an active mode.

In various embodiments, the node address is an 8-bit address. Based on the node address, different device types of messages or groups can be assigned to one or more devices.

| Node Address | TYPE |
| --- | --- |
| 0 | Master |
| 1-200+ | Slave |
| 224-254 | Group ID/Multicast |
| 255 | Broadcast |

As indicated above, the sensor pods 230 provide a response to the core node when it is queried or requested to provide a response. As a result of the master slave relationship between the core node 210 and the sensor pods 230 (or other peripheral devices), the core node 210 is able to control the traffic on the internal bus 214 to minimize congestion.

Figure 8:
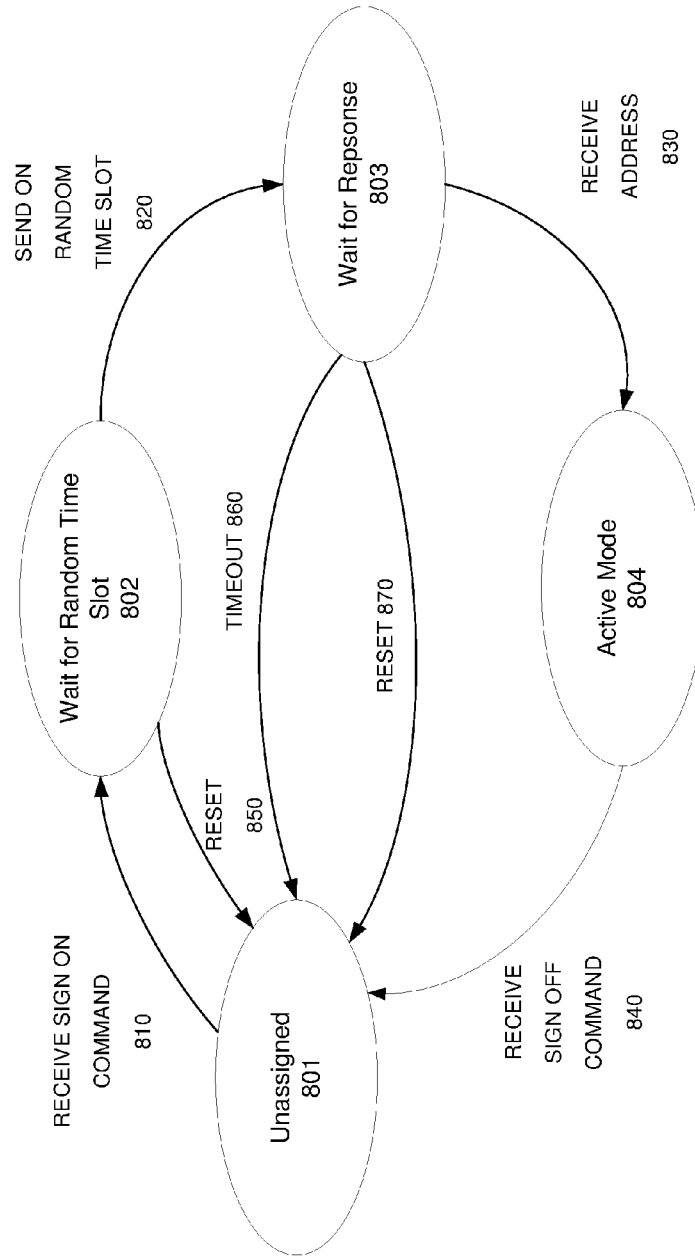
FIG. 8 illustrates an example of a state machine for a slave device within a sensor node according to one embodiment.

FIG. 8 illustrates a state machine of the slave device. At 801, the slave device is at an unassigned state. At 802, the slave device receives a sign on command 810 from the master device. The slave device waits for a random time slot. At 820 the slave device sends information on the random time slot. At 803, the slave device waits for a response from the master device. Once the slave device receives an address at 830, it then operates in an active mode at 804. If the slave device receives a sign off command 840, then it returns to the unassigned state 801. The slave device waits until is it is queried by the master device before responding. The slave device may reset at 850 or 870. The slave device may have a time out at 860.

In alternative embodiments, there may be more than one master device. For example, there may be one main master device who delegates authority to other master devices.

Other examples of sensors that may be used in various embodiments in sensor nodes include biometric sensors, motion sensors, environmental sensors and position sensors. For example, the biometric sensors may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. Examples of motions sensors may include motion components such as acceleration sensor components (e.g., accelerometer), gravitation sensor components, rotation sensor components (e.g., gyroscope), and so forth. Various environmental sensors may be used which include environmental components such as illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. Various position sensors may include position components such as location sensor components (e.g., a Global Position System (GPS) receiver component), altitude sensor components (e.g., altimeters or barometers that detect air pressure from which altitude may be derived), orientation sensor components (e.g., magnetometers), and the like.

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Figure 9:
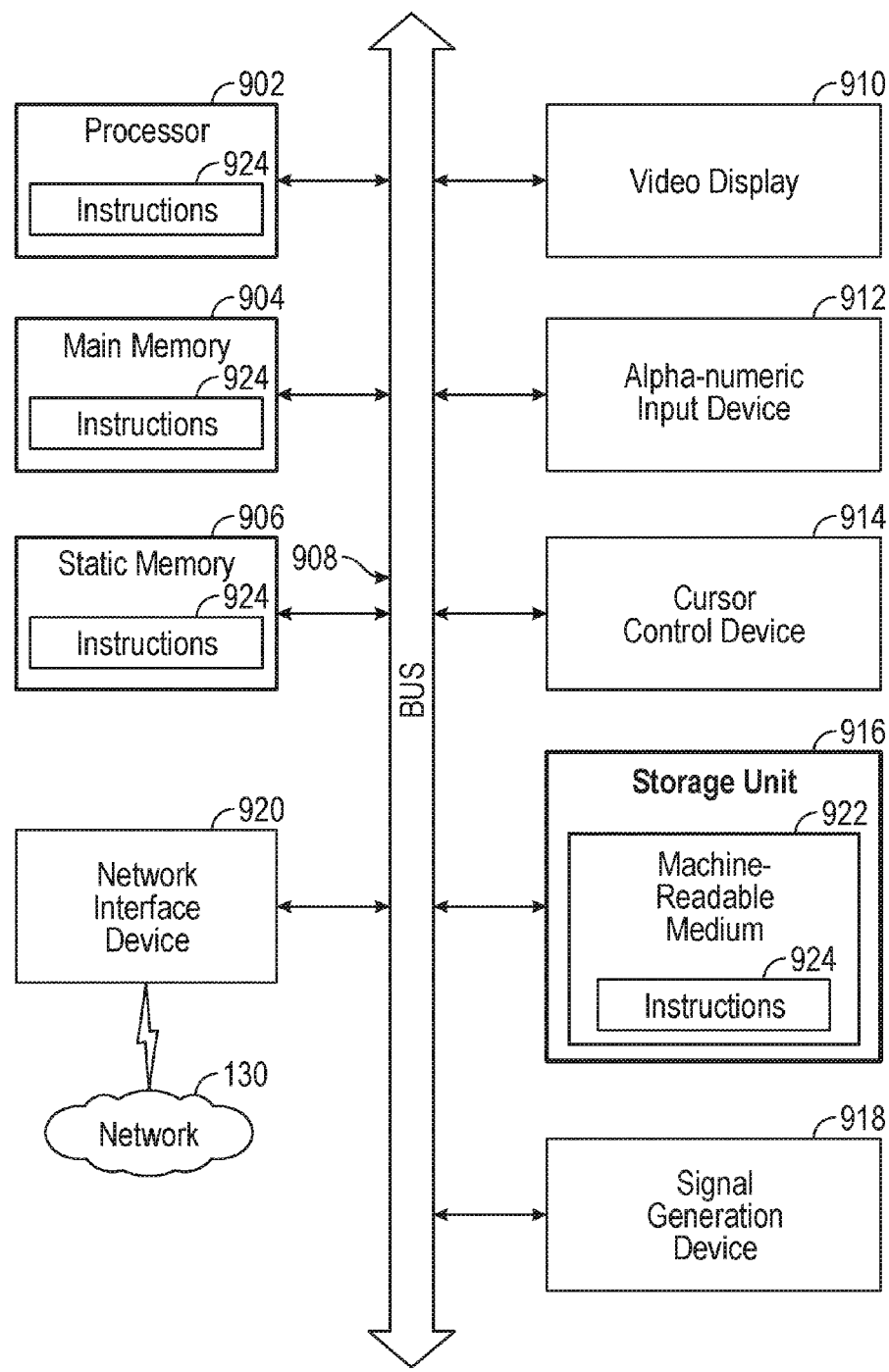
FIG. 9 illustrates a diagrammatic representation of a machine in the form of a computer system within which a set of instructions may be executed for causing the machine to perform any one or more of the methodologies discussed herein, according to an example embodiment.

With reference to FIG. 9, an example embodiment extends to a machine in the example form of a computer system 900 within which instructions for causing the machine to perform any one or more of the methodologies discussed herein may be executed. For example, one or more nodes may be implemented using the computer system 900 to perform data analytics or other processing of the sensor information and/or video information. In alternative example embodiments, the machine operates as a standalone device or may be connected (e.g., networked) to other machines. In a networked deployment, the machine may operate in the capacity of a server or a client machine in a server-client network environment or n-tier network, as a peer machine in a peer-to-peer (or distributed) network environment or in a virtualized cloud computing environment. The machine may be a personal computer (PC), wearable computing device, a tablet PC, a set-top box (STB), a Personal Digital Assistant (PDA), a cellular telephone, a web appliance, a network router, a switch or bridge, sensor node, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 may include a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). In example embodiments, the computer system 900 also includes one or more of an alpha-numeric input device 912 (e.g., a keyboard), a user interface (UI) navigation device or cursor control device 914 (e.g., a mouse), a storage unit 916, a signal generation device 918 (e.g., a speaker), and a network interface device 920.

The storage unit 916 includes a machine-readable storage medium 922 on which is stored one or more sets of instructions 924 and data structures (e.g., software instructions) embodying or used by any one or more of the methodologies or functions described herein. The instructions 924 may also reside, completely or at least partially, within the main memory 904 or within the processor 902 during execution thereof by the computer system 900, with the main memory 904 and the processor 902 also constituting machine-readable media.

While the machine-readable storage medium 922 is shown in an example embodiment to be a single medium, the term "machine-readable storage medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 924 may further be transmitted or received over a communications network 926 using a transmission medium via the network interface device 920 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., Wi-Fi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A sensor node comprising:
    a core node to enable lighting control for a luminaire, the core node having a base forming a plug portion of a socket, the plug portion of the socket having two pins designated as optional pins;
    at least one peripheral device, each peripheral device including one or more sensors for detecting conditions and producing sensor information based on the detected conditions; and
    a pod bus enabling power signals to be transmitted to each of the peripheral devices and communications signals to be transmitted between the core node and each of the peripheral devices via a two wire communication path coupled to the two pins designated as optional pins.

2. The sensor node of claim 1, wherein the socket represents a NEMA socket including a receptacle that is attached to the base of the core node such that the core node is enclosed by the NEMA socket, the NEMA socket conforming to an American National Standards Institute (ANSI) published specification and providing light level control for a light-emitting diode (LED) driver for the luminaire.

3. The sensor node of claim 1, wherein the pod bus extends from the base of the core node to each of the peripheral devices.

4. The sensor node of claim 1, wherein each of the peripheral devices represents one of an integrated sensor pod communicatively coupled to a portion of the pod bus within the luminaire, an external sensor pod communicatively coupled to a portion of the pod bus external to the luminaire, or a video node communicatively coupled to the portion of the pod bus external to the luminaire.

5. The sensor node of claim 4, wherein the integrated sensor pod is integrated with the luminaire by a manufacturer of the luminaire.

6. The sensor node of claim 4, wherein the portion of the pod bus external to the luminaire represents a cable attached to a connector on the core node; and wherein the external sensor pod is communicatively coupled to the cable.

7. The sensor node of claim 4, wherein the portion of the pod bus external to the luminaire enables video nodes and external sensor pods to be added to the sensor node after the sensor node is deployed in the field.

8. The sensor node of claim 4, wherein the portion of the pod bus external to the luminaire represents a cable attached to a connector on the core node; and wherein the video node comprising at least one video camera communicatively coupled to the cable.

9. The sensor node of claim 6, wherein the cable including a splitter to enable more than one peripheral device to be attached to the cable.

10. The sensor node of claim 4, wherein video node performs video analytics data processing prior to transmitting video data, directly or indirectly, to a service data platform.

11. The sensor node of claim 1, wherein the sensor node represents a lighting node in a lighting sensor network.

12. The sensor node of claim 1, wherein the communication signals represents at least one of command, request, and interrupt signals from the core node transmitted to the least one peripheral device.

13. The sensor node of claim 1, wherein the communication signals include data signals that transmit the sensor information from each of the peripheral devices to the core node.

14. The sensor node of claim 4, wherein the core node collects the sensor information detected by at least one of the integrated sensor pod or the external sensor pod and transmits the sensor information to a service data platform to enable one or more applications to access the sensor information; and wherein the accessed sensor information includes raw sensor information or processed sensor information at the core node and the service data platform.

15. The sensor node of claim 4, wherein the core node collects the video information captured by the at least one video camera and transmit the video information to a service data platform to enable one or more applications to access the video information; and wherein the accessed video information includes raw video information or processed video information the core node and the service data platform.

16. The sensor node of claim 1, wherein the core node represents a master device and each peripheral device represents a slave device, and wherein the pod bus represents a master-slave bus.

17. The sensor node of claim 16, wherein the pod bus enabling the core node to query the each of the peripheral devices and each of the peripheral devices to respond to a query from the core node.

18. A lighting node comprising:
    a luminaire housing that includes a light-emitting diode (LED) driver and a light engine;
    a core node positioned within the luminaire housing, the core node enabling lighting control for the luminaire;
    at least one peripheral device, the at least one peripheral device including an integrated sensor pod having one or more sensors for detecting conditions and producing sensor information based on the detected conditions;
    a pod bus positioned within the luminaire housing and representing a master-slave bus, the pod bus enabling power signals to be transmitted to each of the peripheral devices, the core node representing a master device and each of the peripheral devices representing a slave device such that the pod bus enables the core node to query each of the peripheral devices and each of the peripheral devices to respond to a query from the core node and each of the peripheral devices having the capability of sending an interrupt to the core node.

19. The sensor node of claim 1, wherein the pod bus extends from the core node to each of the peripheral devices.

20. The sensor node of claim 18, wherein each of the peripheral devices represents one of the integrated sensor pod communicatively coupled to a portion of the pod bus within the luminaire, an external sensor pod communicatively coupled to a portion of the pod bus external to the luminaire, or a video node communicatively coupled to the portion of the pod bus external to the luminaire.

21. The sensor node of claim 18, wherein the integrated sensor pod is integrated with the luminaire by a manufacturer of the luminaire.

22. The sensor node of claim 18, wherein the portion of the pod bus external to the luminaire represents a cable attached to a connector on the luminaire; and wherein the external sensor pod is communicatively coupled to the cable.

23. The sensor node of claim 18, wherein the portion of the pod bus external to the luminaire enables video nodes and external sensor pods to be added to the sensor node after the sensor node is deployed in the field.

24. A sensor network, comprising:
    a plurality of sensor nodes communicatively coupled via a network, at least some of the sensor nodes comprising:

a core node to enable lighting control for a luminaire, the core node having a base conforming to a plug portion of a National Electronic Manufacturers Association (NEMA) socket, the plug portion of the NEMA socket having two pins designated as optional pins;

at least one peripheral device, each peripheral device including one or more sensors for detecting conditions and producing sensor information based on the detected conditions; and a pod bus enabling power signals to be transmitted to each of the peripheral devices and communications signals to be transmitted between the core node and each of the peripheral devices via a two wire communication path coupled to the two pins designated as optional pins.

* * * * *